United States Patent [19]
Kelsic

[11] Patent Number: 6,046,877
[45] Date of Patent: *Apr. 4, 2000

[54] PROTECTION APPARATUS AND METHOD FOR HARD DISK DRIVE UNIT OF A PORTABLE COMPUTER

[75] Inventor: Gary F. Kelsic, Longmont, Colo.

[73] Assignee: Mobile Storage Technology, Inc., Boulder, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/846,514

[22] Filed: Apr. 29, 1997

Related U.S. Application Data

[63] Continuation of application No. 08/389,368, Feb. 16, 1995, abandoned.

[51] Int. Cl.[7] ................................................ G11B 21/02
[52] U.S. Cl. ................................................. 360/75; 360/69
[58] Field of Search .......................................... 360/75, 69

[56] References Cited

U.S. PATENT DOCUMENTS

| | | | |
|---|---|---|---|
| 4,862,298 | 8/1989 | Genheimer et al. | 360/60 |
| 5,227,929 | 7/1993 | Comerford | 360/75 |
| 5,235,472 | 8/1993 | Smith | 360/60 |
| 5,333,138 | 7/1994 | Richards | 360/75 |
| 5,760,986 | 6/1998 | Morehouse et al. | 360/77.08 X |

FOREIGN PATENT DOCUMENTS

| 203505 | 7/1994 | Japan | 360/75 |
|---|---|---|---|

OTHER PUBLICATIONS

Microsoft Press Computer Dictionary ©1991, p. 259.

*Primary Examiner*—Aristotelis M. Psitos
*Assistant Examiner*—Alan Faber
*Attorney, Agent, or Firm*—Skjerven, Morrill, MacPherson Franklin and Friel; David W. Heid; Fabio E. Marino

[57] ABSTRACT

An acceleration sensing device senses the acceleration of a computer such that the computer is subject to zero support force (i.e., is in a free fall), and a control microprocessor of the disk drive unit determines that such state lasts for longer than a certain minimum of time. Upon these conditions being met, the control microprocessor signals the removal of the heads from the disk to park the heads.

7 Claims, 2 Drawing Sheets

PROTECTION APPARATUS AND METHOD FOR HARD DISK DRIVE UNIT OF A PORTABLE COMPUTER

This application is a continuation of application Ser. No. 08/389,368, filed Feb. 16, 1995, now abandoned.

FIELD OF THE INVENTION

The present invention generally relates to protection of a hard disk drive in a portable computer, and more particularly, to a protection scheme which parks the heads of a hard disk drive in the event a portable computer is dropped.

BACKGROUND OF THE INVENTION

Present laptop, palmtop or other type of portable battery powered computers include miniature disk drive units which can be subjected to extreme shocks, for example when such a computer is dropped during normal use. In some cases, severe damage may occur to the computer.

The hard disk drive of a computer is especially vulnerable to impact because the proper operation of the drive is dependent on the maintenance of a very small gap between the drive heads and the disk. In the event that the heads were to contact the disk upon a shock to the computer, the heads could be damaged, and perhaps even more serious, magnetic material containing data could be damaged. This phenomenon, known as "head crash", can irretrievably destroy data.

Thus it is important to prevent contact between the heads and disk upon impact, so that valuable data stored on the disk is preserved.

Typical prior art methods of protection rely on reaction to the shock to the portable computer after it occurs (see, for example, U.S. Pat. No. 5,235,472 to Smith and U.S. Pat. No. 4,862,298 to Genheimer et al.). These methods rely on the heads being parked either on a data-free landing zone or unloaded from the disk surface, it being understood that in general the disk drive can tolerate greater shock with the heads parked than when the heads are in a loaded state. Clearly superior to this is an approach which is predictive, using data for protecting the disk drive prior to impact of the computer.

U.S. Pat. No. 5,227,929 to Comerford proposes such a system which includes a three axis accelerometer and a dedicated microprocessor which interrupts the computer CPU so that the CPU can exercise a program to communicate with the disk drive which in turn commands the heads of the disk drive to retract. This series of events takes a relatively long time, which in fact may be so long that the computer may be subject to impact prior to the heads being retracted. Furthermore, the combination of a three axis accelerometer and a dedicated microprocessor is a complex and expensive proposed solution. In addition, operation is dependent on the control microprocessor taking action and the disk drive responding in time to prevent damage.

It would be highly advantageous to provide a low cost method of predicting shocks that can be implemented within the disk drive unit and which utilizes the embedded disk drive control microprocessor so as to avoid unpredictable delays and host computers system and software dependencies.

SUMMARY OF THE INVENTION

Normally, a properly supported computer is subject to a 1G support force, reacting to the force of gravity thereon. An acceleration sensing device senses that the computer is subject to substantially zero support force, i.e., is in a free fall with acceleration of 1G. That is, the accelerometer senses a 1G difference from the supported rest condition of the computer.

The control microprocessor of the disk drive unit determines that such acceleration lasts for longer than a certain minimum time. Upon these conditions being met, the control microprocessor, provided signals by the accelerometer, sends a signal to remove the heads from the disk. Thus, the heads are in an unloaded state upon impact, and data on the disk is protected.

DESCRIPTION OF THE PREFERRED EMBODIMENT

Figure 1:
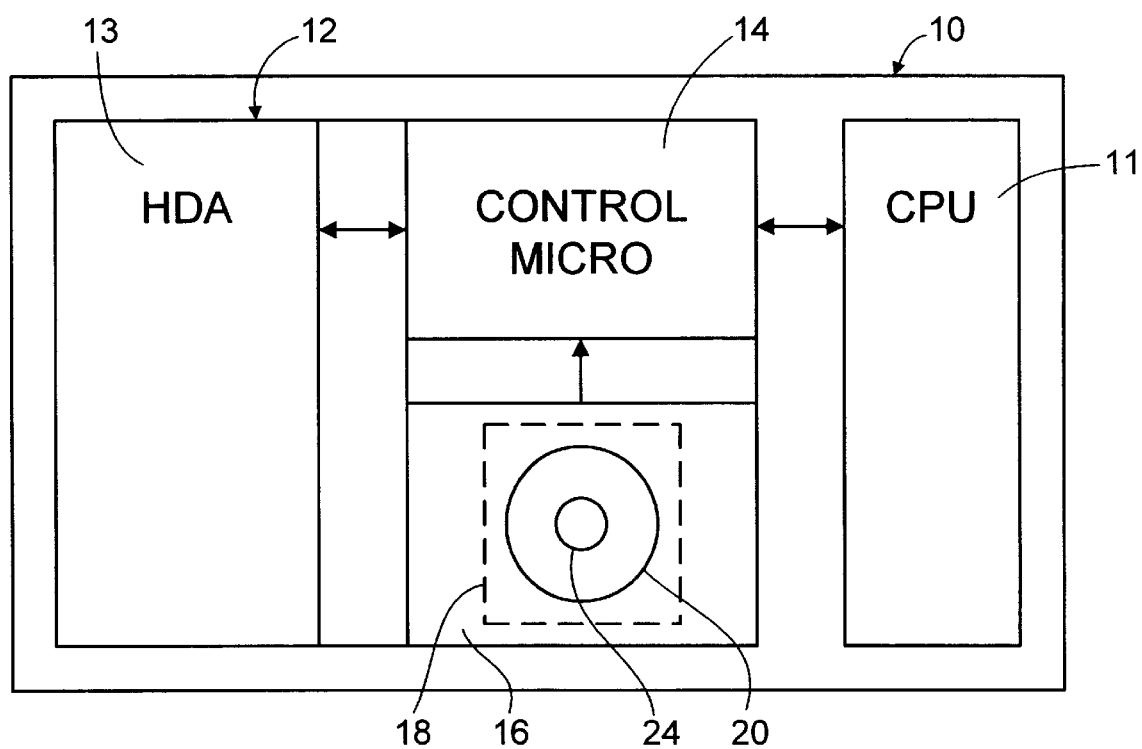
FIG. 1 is a functional block diagram showing the components of the system according to the invention.

Referring to the drawings, and more particularly FIG. 1, the present laptop, palmtop or other type of portable computer 10 includes a CPU 11 and a hard disk drive unit 12. The disk drive unit 12 includes a hard disk assembly (HDA) 13 which includes heads, a disk, an actuator, and a spindle, all in a sealed enclosure, and a disk drive control microprocessor 14 embedded in the unit 12 for control thereof. During the normal functioning of the computer 10, the control microprocessor 14 communicates with the CPU 11, and sends signals to and receives signals from the disk and heads of the HDA 13 for operation thereof.

An acceleration sensing device 16, which senses acceleration of the computer 10 during movement thereof, and which may take the form as shown in copending patent application entitled "Free-Fall Detector for Miniature Disk Drive," Ser. No. 08/389,364, filed Feb. 16, 1995, now abandoned, assigned to the Assignee of this invention (herein incorporated by reference) is connected to the control microprocessor 14 to send signals thereto.

Figure 2:
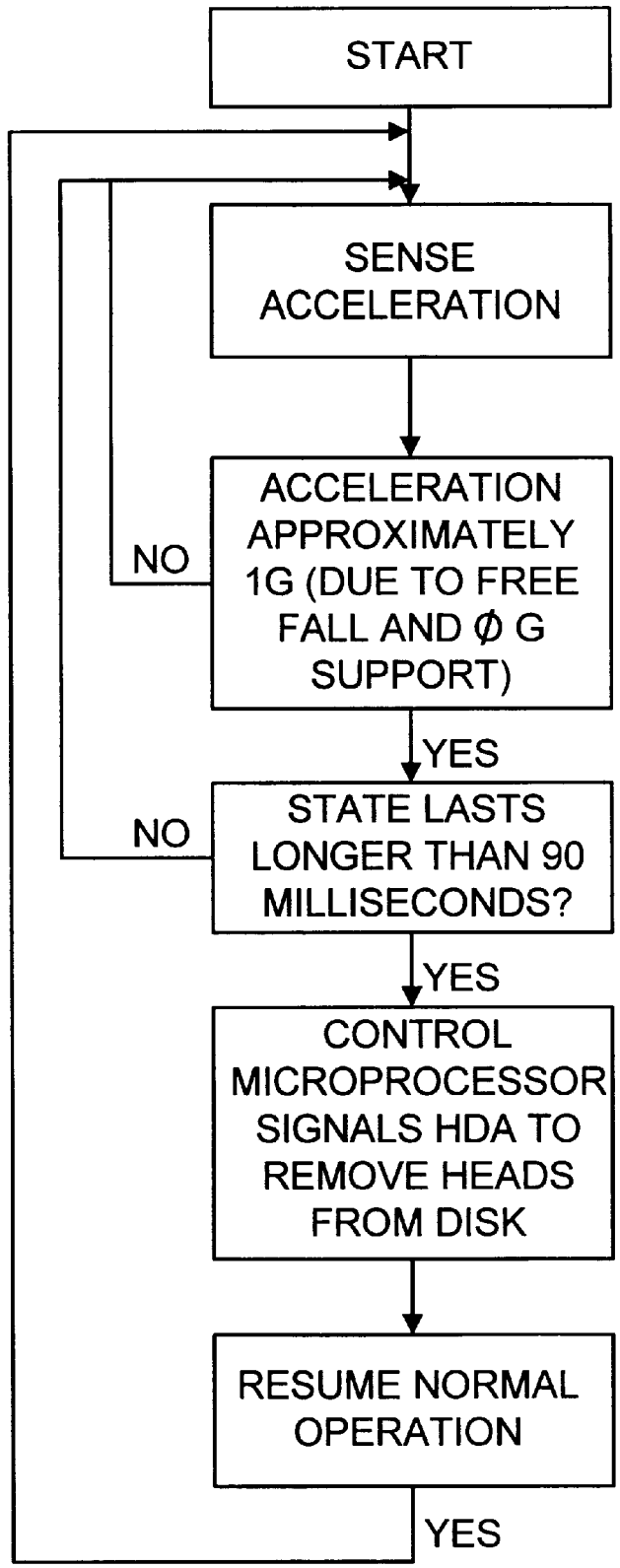
FIG. 2 is a flow chart illustrating the sequence of steps for the system of the invention.

The functioning of the system will be described with reference to FIG. 2.

Initially, the goals of such a system must be understood. First, it is important that the signal to unload must be provided soon enough to provide for retraction of the heads prior to impact of the falling computer on a surface. Second, there must be enough delay in the system to prevent undesired retraction of the heads upon movement of the computer which would not be expected to cause damage to the heads or disk in normal procedure.

After startup of the computer 10, the acceleration sensing device 16 senses acceleration of the computer 10 in the event that, for example, it is dropped and in free fall, and sends a signal based on such acceleration to the control microprocessor 14. The acceleration sensing device 16 in particular senses that the computer 10 is subject to substantially zero support force, i.e., is in a state of free fall, accelerating at substantially 1G. In the event that such state is sensed by the control microprocessor 14 as described below to be longer than a chosen time, the control microprocessor 14 signals the HDA 13 to remove the heads from the disk and into an unloaded state. In a computer of this type, once a signal is provided by the control microprocessor, retraction of the heads takes about 30 milliseconds.

The time delay is used to insure that a sufficient free fall occurs so that there would indeed be danger of the heads contacting the disk upon impact. For example, a free fall of three inches by the computer 10 from a standing position under the force of gravity would take approximately 125 milliseconds. It can be assumed that for free fall of a few inches or more, it would be desirable to retract the heads from the disk so as to protect the system upon impact, but for free falls of less than that distance, the shock upon impact would not be sufficient to cause damage to the heads or to data on the disk.

Furthermore, shock sensing that occurs after too short a time from initial sensing of acceleration could cause inadvertent false triggering and force the disk to spuriously unload the heads during operating conditions which are normally tolerable within operating shock specification. These shocks are typically in the 1 to 2 millisecond length and occur, for example, in certain high vibration environment such as on airplanes or on motor vehicles.

Thus, the time delay might be chosen as at least 90 milliseconds from the time free fall is initially sensed. Upon such time passing, the heads are signaled to retract, which takes 30 milliseconds to complete. Thus, after a free fall of 120 milliseconds, the heads are unloaded and along with the disk are in a protected state, capable of withstanding a very large impact, and cannot suffer "head crash".

Using an electronic analog or digital integrator, it is possible to provide for the delay as set forth above prior to unloading the heads.

In the preferred embodiment, the shock sensor and integration function would be incorporated into the disk drive unit 12. The control microprocessor 14 which is part of the disk drive unit 12 would receive the signals from the acceleration sensing device 16 and internally execute required commands to unload the heads from the disk surface so as to assure rapid action. Integration value can be adjusted to suit disk drives with various operating and non-operating shock specifications.

Using the disk drive control microprocessor to provide unloading of the heads has the additional advantage that an additional microprocessor or action by the host CPU is not required, making faster and more reliable operation possible. A further advantage of the invention is that it is self contained and host CPU independent. Thus, any laptop, palmtop, or other portable computer would benefit from the present system without modification, an important advantage when the disk drive may be used in a variety of different computer and computer CPU systems or added as an—aftermarket product.

I claim:

1. An apparatus for protecting a hard disk structure operational as part of a portable computer, said hard disk structure being of the type having a head flying over a disk surface, comprising:

an acceleration sensing device for sensing a state of movement of the computer;

a microprocessor for controlling the operation of the disk drive structure and for receiving signals from the acceleration sensing device for retracting the head from the proximity of the disk surface in response to said sensing; and a head removal apparatus operatively connected with said acceleration sensing device for retracting the head from the proximity of the disk surface in response to said sensing and after a time delay subsequent to initial sensing of a state of movement, wherein said retracting is performed in 30 milliseconds or less.

2. The apparatus of claim 1, wherein the microprocessor is contained within a physical assembly of the of the hard disk structure.

3. A method of protecting a hard disk structure of a portable computer, said hard disk structure being of the type having a head flying over a disk surface, comprising:

sensing a state of movement of the computer; and in response to said sensing, a microprocessor controlling a head removal apparatus to retract the head from the proximity of the disk surface after a time delay subsequent to initial sensing of said state of movement, wherein said retracting is performed in 30 milliseconds or less.

4. The method of claim 3 further comprising the step of delaying said retracting of the head for a preset period of time after initial sensing.

5. The method of claim 4 wherein the preset, period of time is at least 90 milliseconds.

6. The method of claim 4 wherein the state of sensing comprises sensing a free fall.

7. The method of claim 3, wherein the microprocessor is contained within a physical assembly of the of the hard disk structure.

* * * * *